Nov. 17, 1953 R. H. WINCHESTER 2,659,858
APPARATUS FOR DETECTING FLAWS IN METALS
Filed April 12, 1949 2 Sheets-Sheet 1

Inventor:
Robert H. Winchester,
By
C. C. Hines,
ATTORNEY.

Nov. 17, 1953   R. H. WINCHESTER   2,659,858
APPARATUS FOR DETECTING FLAWS IN METALS
Filed April 12, 1949   2 Sheets-Sheet 2
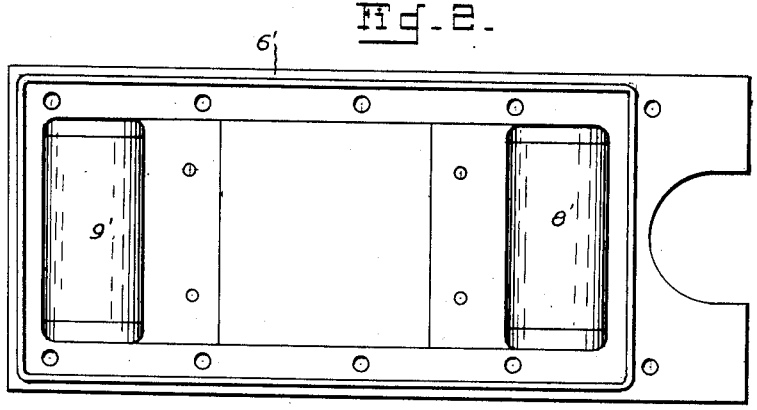
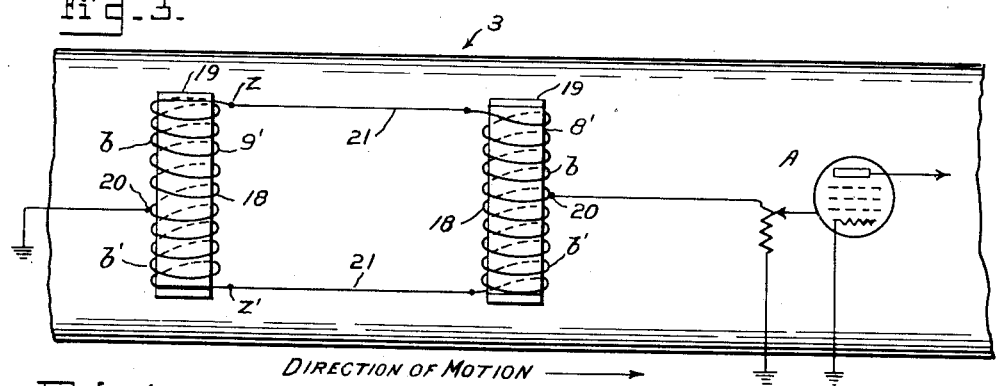
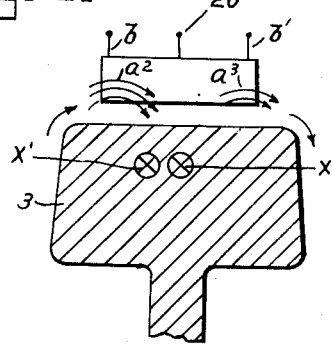
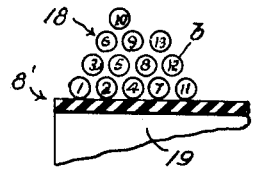
Inventor:
Robert H. Winchester,
By
ATTORNEY.

Patented Nov. 17, 1953

2,659,858

UNITED STATES PATENT OFFICE 2,659,858

APPARATUS FOR DETECTING FLAWS IN METALS

Robert H. Winchester, Trenton, N. J.

Application April 12, 1949, Serial No. 87,023

3 Claims. (Cl. 324—37)

This invention relates to mechanism for detecting flaws in metals, particularly railway rails, and is especially directed to improvements in detector mechanisms of the Sperry type employed on detector cars which operate along a railway track to detect fissures and other flaws within the rails. In the Sperry system a direct current from a generator on the car is caused, as the car travels along the rail, to flow through the rail in a longitudinal direction. Motion of the car will accordingly cause successive portions of the rail to be energized by the current flow, thus establishing a magnetic field surrounding the rail, which field is uniform except in the regions of flaw. In such regions the field is distorted and these distortions are detected by means of a detector unit supported on a carriage mounted on the car and consisting of one or more pairs of induction coils. The coils of each pair are opposed and are arranged in tandem, so that first one and then the other coil of a pair will enter a region of flaw to cut a different number of lines of force from the number which is cut in the undistorted field, thereby generating a differential E. M. F. which, after being amplified by a suitable thermionic amplifier, is caused to operate an indicator or recorder, and/or a marking device, such as a paint gun, to mark the points of defect on the rail. As the car proceeds along the track a suitably designed coil supported on the carriage and so positioned as to link the flux above the rail will show pulses at its terminals which will operate a recording device whenever there is a change in the strength of field linking the coil. Since variations in contact resistance at the rail will cause serious variations in the supply current from the generator, and corresponding variations in flux, which will also operate the recording device, it is the common practice to use two such coils or other flux responsive devices in tandem, so connected that their outputs will oppose and spaced along the rail a distance apart equal to at least half the total length of the disturbance it is desired to detect. In practice this distance is about 3''. Variations due to changes in the supply current will thereby be balanced out, while flaws will be detected, since the flux sensitive elements will in turn pass through the flux pattern which is being explored.

However, variations in distance between the flux sensitive elements and the rail will also cause responses of the recorder to the detecting device, and it has heretofore not been found possible to mount the two flux sensitive elements so that both will be affected equally by this change in spacing, since variations in spacing, in the usual construction and tandem arrangement of coils, causes a variation in linkage, as the flux intensity is an inverse function of the distance from the rail and changes in the number of lines threading the leading coil due to this cause are not balanced by changes in the following coil. Thus corrugations, burns and other surface imperfections or irregularities, which it is not desired to detect, will be seen by and affect each coil as a change in spacing and the number of lines linking each coil in turn vary in accordance with this change in spacing and spurious indications will result.

In an application, Serial No. 297,495, filed July 7, 1952, as a division of this application, I have disclosed the use of a detector embodying a pair of spaced coils of metallic core type arranged in tandem and connected in series opposed and to the first stage of a thermionic amplifier, each coil comprising a coil winding and a laminated horizontally disposed E-shaped core. This core is vertically divided or split at its center to form laterally balanced sections arranged in axial alinement or breast-to-breast transversely of the rail and having end legs and center leg portions, about which latter the coil is disposed so that its axis is perpendicular to the length of the core, the core sections being spaced by a non-magnetic shim arranged between the center legs. These coils are mounted on the carriage so that the coil cores extend lengthwise transversely over the rail heads and so that the axes of both coil windings are perpendicular to the surface of the rail, whereby in the travel of the apparatus over the rail the coils respond to flux changes laterally of the rail and operate in the manner hereinafter described to cause pulse differentials giving indications showing the presence of cracks or other true flaws or defects in the rail while eliminating spurious indications due to surface imperfections.

The metallic core type of indicator above referred to is effective for these purposes, but has the disadvantage of being responsive to small (shell) cracks in the rail surface of no importance as regards rail failures and a recording action of which is unnecessary.

It is the object of the present invention to provide a construction of flaw detecting apparatus of simpler type which embodies the use of air-core coils which are less responsive to shell cracks in the rail surface and which will also eliminate those unwarranted indications due to irregularities in the rail surface while being sensitive to actual flaws or other defects within the rail.

Further objects and advantages of the invention will be apparent from the following description, taken in connection with the accompanying drawings, in which:

Figure 2 is a plan view of the detector coil casing employed in the apparatus disclosed in Figure 1, showing the coils mounted therein.

Figure 3 is a top plan view of a portion of a rail showing the arrangement of the coils relative to each other and to the rail and for travel over the rail in a flaw detecting operation.

Figure 4 is a cross section through a rail and a view in side elevation of one of the coil units arranged over the rail head and indicating by arrows the paths of magnetic flux through the unit.

Figure 5 is a detail section through a part of one of the coils showing a preferred manner of winding each air core coil.

Figure 1:
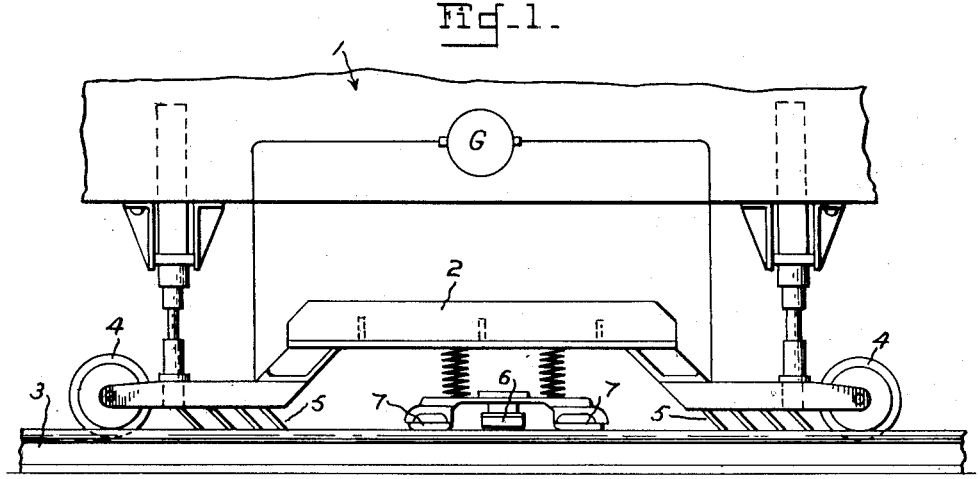
Figure 1 is a side elevation of a test car equipped with a flaw detecting apparatus embodying the invention.

Referring now more particularly to the drawings, 1 designates a portion of a test car body, on which is mounted the detector apparatus, which comprises a carriage 2 adapted to be raised and lowered with relation to the track rails 3, and provided as usual with wheels 4 to travel on the rails and contact brushes 5 to engage the rails when the carriage is lowered and disposed in operative position, the brushes being connected to a generator G on the car whereby direct current is supplied to the rails as the carriage travels therealong to produce the magnetic field which is to be explored or investigated for the detection of fissures or other damaging flaws in the rails. The carriage also supports the detector coil casing or housing 6 and the usual shoes 7 which support the casing and sensitive detector elements or coils in properly spaced relation to the rails.

The sensitive detector elements shown in Figures 1 to 5, inclusive, consist of a pair of spaced air core coils 8', 9', arranged in tandem and each comprising a continuous winding 18 of the banked type, as used in radio circuits, wherein the turns are wound about an insulated suporting tube 19 in multiple layers as the winding progress from one end of the tube to the other. When the winding process has reached the center line, a tap 20 is connected, after which the winding is continued so that each coil is divided into coil portions or halves $b$, $b'$, each containing the same number of turns and occupying the same amount of tube length. Thus the turns are added in the numbered order shown in Figure 5 so that all the turns included in the halves $b$ of the coils 8', 9' will lie to the left of the center line, while those included in the portions $b'$ of the said coils will lie to the right of the center line. Any other type of winding may, however, be used which will enable the same functional results to be obtained. The two coils are connected by conductors 21 in a standard bridge arrangement, while the center tap of coil 8' is connected to the first stage A of an amplifier and the center tap of coil 9' to ground. By connecting a source of potential at points $z$, $z'$, in place of the flux supplied by the energized rail the arrangement would be that of a Wheatstone bridge.

As stated, detector coil units of the type heretofore employed are sensitive not only to flux changes causing pulse differentials showing flaws, but also to space changes due to corrugations, burns and other irregularities giving spurious indications, and the purpose of the present invention is to provide a detector mechanism which will eliminate such spurious indications. This is accomplished by the novel construction and arrangement of the coils 8' and 9' and by comparing the flux thereby over two adjacent paths above the rail head. In the operation of prior detectors using two conventional series opposed coils the number of flux lines passing through each coil, as the coils pass over burns and corrugations, varies in accordance with the spacing between the coils and the rail, and since the number of lines linking each coil in turn will vary in accordance with this change in spacing, random indications are set up which are not only not true indications of flaws but tend to mask those due to actual flaws. In addition, many flaws are missed because the configuration of the flux pattern over the rail head is such that the net change as seen by the coils is zero.

In the vast majority of cases of actual flaws, there is a lateral change in current path through the rail, accompanied by a corresponding change in leakage flux. The coils 8' and 9' operate normally to balance out changes in flux in a sound rail due to burns, corrugations and energizing changes, but are responsive to those changes in lateral distribution of the flux, due to a flaw, so as to set up an unbalanced condition which will appear as voltage at the coil terminals. This will be understood by reference to Figure 4. When passing over a rail not containing flaws the current axis may be assumed to be at some point $x$, the leakage will be strongest over the center of the rail head, and the down and up flux lines as shown by arrows $a^2$, $a^3$ within the two portions of coil will be balanced and there will be no response. At a flaw location, however, the current will be laterally shifted or displaced to some new point $x'$, the flux through the core will be likewise shifted or displaced and, as the searching element passes through the disturbance, a differential will be set up between the two portions of the coil. For example, at the flaw there will be an increment of flux in the left-hand portion, not balanced by a corresponding change in the right-hand portion, and this will represent an unbalance within the coil. Two pulses will accordingly appear at the coil terminals, one as the coil enters the disturbance and a second impulse of opposite polarity as the coil leaves it, whereby the recorder will be operated.

It will be observed that the coil portions $b$, $b'$ and their turns are arranged coaxially in a straight line, and that each coil is of a length substantially equal to the width of the rail, so that the coil portions $b$, $b'$ traverse two adjacent paths above and along the rail head transversely of and on opposite sides of its longitudinal center line. In such travel the coils are non-responsive to surface imperfections while still being responsive to internal flaws. This is done by comparing the flux above the two adjacent paths traversed, the portions $b$, $b'$ of the coils being normally balanced, in the passage of the device over a sound rail portion where the current axis is at point $x$ and the flux linkage is strongest over the center of the rail head, the flux lines $a^2$, $a^3$ through the two halves of each coil will cancel within the coil and there will be no response. At a flaw location, however, the current will be laterally displaced, and as the leading coil passes through the disturbance a differential will be set up between the two halves $b$, $b'$ of this coil. This follows from the fact that there will be an increment of flux set up, for example, in the left hand portion of the coil not balanced by a change in the right hand portion of the coil. Two impulses, therefore, appear at the coil terminals, one as the coil enters the disturbance and the other as the coil leaves it, whereby the recorder will be operated. In other words, as long as the current axis remains centered at $x$ there will be an equal number of flux lines linking the turns of halves $b$ and $b'$ of coil $8'$ as it passes along the rail head. Lateral displacement of the current axis will cause additional lines to link portion $b$ of coil $8'$ not balanced by additional lines linking portion $b'$ of coil $8'$. Coil $9'$ is at this time outside the disturbed portion of flux and cannot oppose, and the pulses will appear at the coil terminals. Corrugations, which are deepest at the center of the head and consist of alternate ridges and valleys extending across the head and spaced from 2 to 5 inches crest to crest, cause a change of spacing between the search coil and rail as the search coil progresses along the rail head, but there is no appreciable difference in the change as seen by the coil portions and nothing inherent in the corrugation to cause a lateral displacement of the energizing current or the associated flux over the rail, and hence the coil will not respond to such imperfections. Burns generally consist of depressions in the rail head which, like corrugations, cause spacing changes, but do not cause lateral displacement of energizing current, and hence the coil will not respond to imperfections of this character. The portions $b$, $b'$, of the coils being normally balanced, in the passage of the device over a sound rail portion where the current axis is at point $x$ and the flux linkage is strongest over the center of the rail head, the flux lines $a^2$, $a^3$, through the two halves of each coil will cancel within the coil and there will be no response. At a flaw location, however, the current will be laterally displaced to some new point, as $x'$, the flux will be likewise displaced, and as the leading coil passes through the disturbance a differential will be set up between the two halves $b$, $b'$ of this coil. This follows from the fact that there will be an increment of flux set up, for example, in the left hand portion of the coil not balanced by a change in the right hand portion of the coil, which represents an unbalance within the coil. Two impulses will, therefore, appear at the coil terminals, one as the coil enters the disturbance and the other as the coil leaves it, whereby the recorder will be operated. In other words, as long as the current axis remains centered at $x$, there will be an equal number of flux lines linking the turns of halves $b$ and $b'$ of coil $8'$ as it passes along the rail head. Lateral displacement of the current axis will cause additional lines to link portion $b$ of coil $8'$ not balanced by additional lines linking portion $b'$ of coil $8'$. Coil $9'$ is at this time outside the disturbed portion of flux and cannot oppose, and the pulses will appear at the coil terminals.

From the foregoing description, taken in connection with the drawings, the construction and mode of operation of the detector mechanism will be readily understood, and it will be seen that it will operate to effectually indicate flaws in a sound rail while eliminating or nullifying any actions due to these flux changes caused by surface imperfections of the character referred to and which do not affect the soundness of the rail. It is to be understood that while the constructions shown for this purpose are preferred, others of an equivalent nature and operating in the same manner may be used without departing from the spirit of the invention as set forth in the appended claims.

Having thus described my invention, I claim:

1. An apparatus of the character described for detecting flaws in a railway rail or other metallic body associated with a magnetic field, said apparatus including in combination a pair of induction devices movable in the direction of the axis of the body and arranged in tandem with relation to each other, each of said induction devices comprising an air core induction coil arranged axially transversely of the body and having its terminal windings conductively connected to the like windings of the other coil, and each coil being provided with a center tap dividing it into two normally balanced portions for travel above the body over opposite sides of the longitudinal center line of the magnetic field.

2. An apparatus of the character described for detecting flaws in a railway rail or other metallic body associated with a magnetic field, said apparatus including in combination a pair of induction devices movable in the direction of the axis of the body and arranged in tandem with relation to each other, each of said induction devices comprising an air core induction coil arranged axially transversely of the body and formed of bank windings, the terminal windings of said coil being conductively connected to the like windings of the other coil, and each coil being provided with a center tap dividing it into two normally balanced portions for travel above the body over opposite sides of the longitudinally center line of the magnetic field.

3. An apparatus of the character described for detecting flaws in a railway rail or other metallic body associated with a magnetic field, said apparatus comprising in combination a pair of air core induction coils movable in the direction of the axis of the body and arranged in tandem relation to each other and axially transversely of the body and magnetic field, said coils being substantially equal in length to each other and having a like number of windings, the terminal windings of the coils being in conducting connection with each other and each coil being provided with a center tap dividing the coil into two normally balanced like portions for travel above the body over opposite sides of the longitudinal center line of the magnetic field, and an amplifier tube connected with the center taps of the coils so as to be responsive to flux changes producing unlike voltage impulses in the coil portions and a resultant electromotive force to which the tube is responsive for operating a recorder.

ROBERT H. WINCHESTER.

References Cited in the file of this patent
UNITED STATES PATENTS

| Number | Name | Date |
|---|---|---|
| 2,124,411 | De Lanty | July 19, 1938 |
| 2,124,579 | Knerr et al. | July 26, 1938 |
| 2,150,922 | Hay | Mar. 21, 1939 |
| 2,297,879 | Drake | Oct. 6, 1942 |
| 2,307,446 | Bettison | Jan. 5, 1943 |
| 2,472,784 | Barnes et al. | June 14, 1949 |